(12) United States Patent
Cheverton et al.

(10) Patent No.: US 9,964,455 B2
(45) Date of Patent: May 8, 2018

(54) METHODS FOR MONITORING STRAIN AND TEMPERATURE IN A HOT GAS PATH COMPONENT

(71) Applicant: General Electric Company, Schenectady, NY (US)

(72) Inventors: Mark Allen Cheverton, Mechanicville, NY (US); Anant Achyut Setlur, Niskayuna, NY (US); Victor Petrovich Ostroverkhov, Ballston Lake, NY (US); Guanghua Wang, Clifton Park, NY (US); James Anthony Brewer, Scotia, NY (US); Venkat Subramaniam Venkataramani, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 614 days.

(21) Appl. No.: 14/504,961

(22) Filed: Oct. 2, 2014

(65) Prior Publication Data

US 2016/0153842 A1 Jun. 2, 2016

(51) Int. Cl.
*G01J 5/00* (2006.01)
*G01L 1/24* (2006.01)
(Continued)

(52) U.S. Cl.
CPC ............. *G01L 1/24* (2013.01); *G01K 1/143* (2013.01); *G01K 11/20* (2013.01)

(58) Field of Classification Search
USPC .......................................... 374/121, 161, 100
See application file for complete search history.

(56) References Cited

U.S. PATENT DOCUMENTS 4,448,547 A * 5/1984 Wickersheim ............ G01J 5/48
250/337
4,708,494 A * 11/1987 Kleinerman ........... G01D 5/268
250/361 R
(Continued)

FOREIGN PATENT DOCUMENTS

CN 101858872 B 9/2011
CN 103558144 A 2/2014
(Continued)

OTHER PUBLICATIONS

Tobin, Kenneth et al, Fiber Sensor Design for Turbine Engines, Industrial Application of Fiber Optic Sensors, Dec. 1, 1991, pp. 23-31, vol. 1584.
(Continued)

*Primary Examiner* — Mirellys Jagan
(74) *Attorney, Agent, or Firm* — GE Global Patent Operation

(57) ABSTRACT

A method of monitoring a surface temperature of a hot gas path component includes directing an excitation beam having an excitation wavelength at a layer of a sensor material composition deposited on a hot gas path component to induce a fluorescent radiation. The method includes measuring fluorescent radiation emitted by the sensor material composition. The fluorescent radiation includes at least a first intensity at a first wavelength and a second intensity at a second wavelength. The surface temperature of the hot gas path component is determined based on a ratio of the first intensity at the first wavelength and the second intensity at the second wavelength of the fluorescent radiation emitted by the sensor material composition.

16 Claims, 8 Drawing Sheets

(51) Int. Cl.
*G01K 1/14* (2006.01)
*G01K 11/20* (2006.01)

(56) References Cited

U.S. PATENT DOCUMENTS

| | | | |
|---|---|---|---|
| 4,774,150 A | 9/1988 | Amano et al. | |
| 5,004,913 A * | 4/1991 | Kleinerman | G01J 5/08 250/227.21 |
| 5,698,397 A * | 12/1997 | Zarling | B82Y 15/00 216/25 |
| 5,730,528 A * | 3/1998 | Allison | G01K 11/20 250/459.1 |
| 6,123,997 A | 9/2000 | Schaeffer et al. | |
| 6,730,918 B2 | 5/2004 | Srivastava et al. | |
| 6,943,357 B2 | 9/2005 | Srivastava et al. | |
| 7,507,022 B2 | 3/2009 | Bird | |
| 7,858,952 B2 | 12/2010 | Feist et al. | |
| 7,901,203 B2 | 3/2011 | Ni et al. | |
| 8,004,423 B2 | 8/2011 | Mitchell et al. | |
| 8,132,467 B2 | 3/2012 | Shinde et al. | |
| 8,173,266 B2 | 5/2012 | Choy et al. | |
| 8,221,825 B2 | 7/2012 | Reitz et al. | |
| 8,313,794 B2 | 11/2012 | Vance | |
| 2002/0006153 A1 | 1/2002 | Ranson et al. | |
| 2003/0021331 A1* | 1/2003 | Balla | G01K 11/00 374/161 |
| 2003/0048831 A1* | 3/2003 | Lemoine | G01K 11/20 374/135 |
| 2003/0128737 A1* | 7/2003 | McGrath | G01K 11/3213 374/161 |
| 2006/0177676 A1 | 8/2006 | Bast et al. | |
| 2007/0134518 A1* | 6/2007 | Feist | C23C 4/12 428/701 |
| 2009/0122832 A1 | 5/2009 | Feist et al. | |
| 2009/0202864 A1 | 8/2009 | Feist et al. | |
| 2009/0226326 A1* | 9/2009 | Choy | C23C 30/00 416/241 R |
| 2010/0035043 A1 | 2/2010 | Bird | |
| 2011/0069735 A1 | 3/2011 | Feist et al. | |
| 2011/0236657 A1 | 9/2011 | Feist et al. | |
| 2013/0062323 A1 | 3/2013 | Hassan et al. | |
| 2014/0030464 A1 | 1/2014 | Das et al. | |
| 2016/0002529 A1* | 1/2016 | Blahuta | C09K 11/7774 250/361 R |
| 2016/0097719 A1* | 4/2016 | Cheverton | G01J 5/10 250/459.1 |

FOREIGN PATENT DOCUMENTS

| | | |
|---|---|---|
| DE | 69905907 T2 | 12/2003 |
| EP | 1688723 B1 | 10/2007 |
| GB | 2439389 A | 12/2007 |
| JP | 3281857 B2 | 5/2002 |
| JP | 2004093300 A | 3/2004 |
| JP | 2005146291 A | 6/2005 |
| JP | 2007297947 A | 11/2007 |
| JP | 2009149492 A | 7/2009 |
| JP | 2006143553 B2 | 8/2011 |
| WO | 2012027442 A1 | 3/2012 |

OTHER PUBLICATIONS

Alaruri, Sami D. et al, High-Temperature Remote Thermometry Using Later-Induced Fjluorescence Decay Lifetime Measurements of Y2O3:Eu and YAG:Tb Thermographic Phosphors, Instrumentation and Measurement, IEEE Transactions, Jun. 1993, pp. 735-739, vol. 42, Issue 3.

M.D. Chambers et al, Terbium as an alternative for Luminescence Sensing of Temperature of Thermal Barrier Coating Materials, Surface Coatings Technology, ScienceDirect, Dec. 15, 2007, pp. 688-692, vol. 202, Issues 4-7.

Fuhrmann, N. et al, High-Speed Phosphor Thermometry, Review of Scientific Instruments, IEEE, Oct. 2011, pp. 104903-104903-4, vol. 82, Issue 10.

M.D. Chambers et al, Luminescence Thermometry for Environmental Barrier Coating Materials, Surface and Coatings Technology, ScienceDirect, Dec. 25, 2008, pp. 461-465, vol. 203, Issues 5-7.

* cited by examiner

METHODS FOR MONITORING STRAIN AND TEMPERATURE IN A HOT GAS PATH COMPONENT

BACKGROUND

The subject matter described herein relates generally to methods and systems for monitoring hot gas path component conditions, and more specifically, to methods for monitoring temperature and strain of hot gas path components using a ceramic-based sensor material composition.

Higher operating temperatures for gas turbine engines are continuously sought in order to increase their efficiency. However, as operating temperatures increase, the high temperature durability of the components of the engine must correspondingly increase. The operating environment within the gas turbine engine is both thermally and chemically hostile and deleterious to certain engine components. If the components are located in certain sections of the engine such as the combustors or high pressure turbine, they generally cannot withstand long service exposure. Typically the surfaces of these components are coated with a protective system, such as a thermal barrier coating (TBC) or an environmental barrier coating (EBC). Generally, a TBC includes an environmentally-resistant bond coat layer and a TBC layer of a ceramic material applied as a topcoat over the bond coat. An EBC, similarly, often includes various material layer combinations including a bond coat layer and an outer layer.

Increased power output of a gas turbine is achieved by heating the gas flowing through the combustion section to as high a temperature as is feasible. However, the heated gas also heats the various turbine components as it flows through the turbine. These turbine components have a direct impact on the operation and efficiency of the turbine. With time, continued flow of excessively high temperature air wears down the component protective TBC layer and the EBC outer layer.

Some known coating life monitoring methods are based on average effects of stress and temperature profiles of all the parts in the turbine engine. These methods, however, are typically unable to focus on individual parts because they do not take into account the exposure circumstances of a particular part or section of a part. A particular part or section of a part may uniquely encounter excessive stress or damage caused by foreign objects, varying operating conditions from site to site, and turbine over-firing. Such circumstances can uniquely influence part life. However, monitoring a particular part that may be subjected to a local heating that is not represented by an overall system temperature is very difficult.

BRIEF DESCRIPTION

In one aspect, a method of monitoring a surface temperature of a hot gas path component is provided. The method includes directing an excitation beam having an excitation wavelength at a layer of a sensor material composition deposited on the hot gas path component. The method also includes measuring a fluorescent radiation emitted by the sensor material composition. The fluorescent radiation includes a first intensity at a first wavelength and a second intensity at a second wavelength. In addition, the method includes determining a surface temperature of the hot gas path component based on a ratio of the first intensity at the first wavelength and the second intensity at the second wavelength of the fluorescent radiation emitted by the sensor material composition.

In another aspect, a method of monitoring a temperature and an amount of strain of a hot gas path component is provided. The method includes directing a first excitation beam at a first layer of a sensor material composition deposited on the hot gas path component. The method also includes measuring fluorescent radiation emitted by the sensor material composition in response to the first excitation beam. The fluorescent radiation includes at least a first emission peak having a first baseline wavelength and a first baseline intensity, and a second emission peak having a second baseline wavelength and a second baseline intensity. Furthermore, the method includes exposing the hot gas path component to a gas flow. In addition, the method includes directing a second excitation beam at the sensor material composition, and measuring fluorescent radiation emitted by the sensor material composition in response to the second excitation beam. A first emission peak includes a first successive wavelength and a first successive intensity, and a second emission peak includes a second successive wavelength and a second successive intensity. The method includes determining a surface temperature of the hot gas path component based on one or more of the first successive intensity and the second successive intensity, and determining an amount of strain the in hot gas path component based on a difference between the first baseline wavelength and the first successive wavelength, and a difference between the second baseline wavelength and the second successive wavelength of the fluorescent radiation.

DRAWINGS

These and other features, aspects, and advantages of the present disclosure will become better understood when the following detailed description is read with reference to the accompanying drawings in which like characters represent like parts throughout the drawings, wherein.

Figure 1:
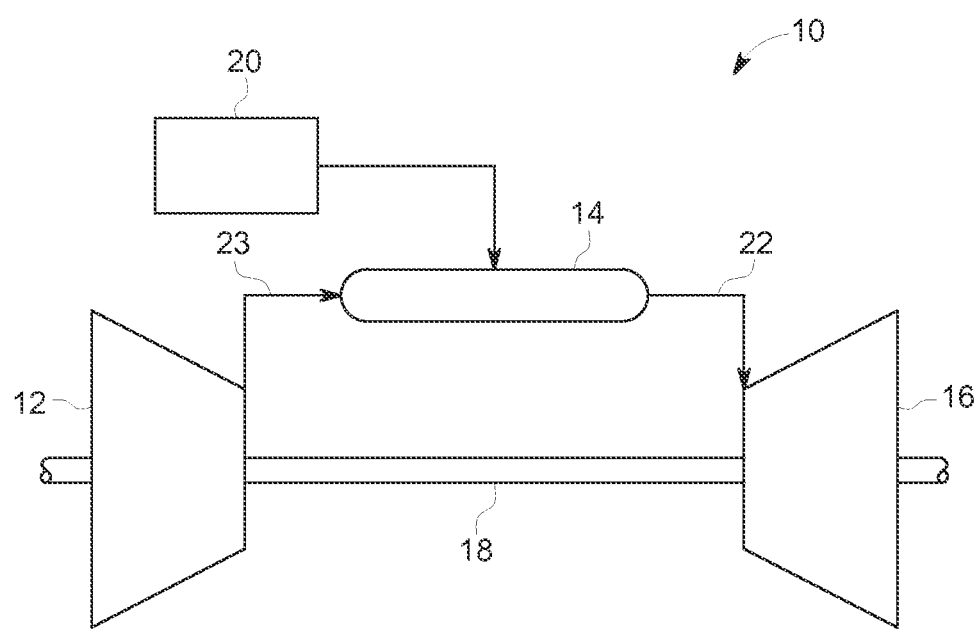
FIG. 1 is a schematic view of an exemplary gas turbine engine.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings. The singular forms "a", "an", and "the" include plural references unless the context clearly dictates otherwise. "Optional" or "optionally" means that the subsequently described event or circumstance may or may not occur, and that the description includes instances where the event occurs and instances where it does not. Furthermore, references to "one embodiment" are not intended to be interpreted as excluding the existence of additional embodiments that also incorporate the recited features. Moreover, unless explicitly stated to the contrary, embodiments "including" or "having" an element or a plurality of elements having a particular property may include additional such elements not having that property.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

The methods described herein facilitate measuring one or more of a temperature and a strain associated with a hot gas path component having a thermal barrier coating (TBC). Specifically, the methods described herein facilitate using a radiation source to cause an indicator material on the surface of the hot gas path component, and in particular on the TBC, to fluoresce. A ratio of the intensities of the fluorescent emissions is based on a surface temperature of the hot gas path component, and a specific wavelength of the fluorescent emission is based on a specific indicator material formed on the hot gas path component. Furthermore, the methods described herein facilitate using the radiation source to cause an indicator material to fluoresce. A specific wavelength of the fluorescent emission shifts to a different wavelength based on an amount of strain generated in the hot gas path component. Specifically, one of the embodiments described herein facilitates monitoring the strain in the hot gas path component by forming a layer of an indicator material on the outer surface of the hot gas path component or the TBC, where the indicator material fluoresces at a specific wave length based on the amount of strain induced in the indicator material. As such, the embodiments described herein provide for accurate surface temperature and strain measurements for the hot gas path component, use of the existing TBC composition without adding other materials, facilitating online real-time hot gas path component health monitoring and prognosis, and facilitating hot gas path component life monitoring and quality control.

FIG. 1 is a schematic view of a rotary machine, i.e., a turbomachine, and more specifically, a turbine engine. In the exemplary embodiment, the turbine engine is a gas turbine engine 10. Alternatively, the rotary machine is any other turbine engine and/or rotary machine, including, without limitation, a steam turbine engine, a centrifugal compressor, and a turbocharger. In the exemplary embodiment, gas turbine engine 10 includes at least one of each of a compressor 12, a combustor 14, a turbine 16, and a fuel nozzle 20. Fuel nozzle 20 is configured to inject and mix fuel (not shown) with compressed air 23 in combustor 14. Combustor 14 ignites and combusts the fuel-air mixture (not shown) and then passes a hot gas flow 22 into turbine 16. Turbine 16 includes one or more stators having fixed vanes or blades (not shown), and one or more rotors having blades or buckets (not shown in FIG. 1) that rotate relative to the stators. Hot gas flow 22 passes over the turbine rotor blades, thereby driving the turbine rotor to rotate. Turbine 16 is coupled to rotatable shaft 18 where it rotates the shaft as hot gas flow 22 passes over the turbine blades. Rotatable shaft 18 is coupled to compressor 12. Compressor 12 includes blades (not shown) rigidly mounted to a rotor (not shown) that is driven to rotate by rotatable shaft 18. As air passes over the rotating blades, air pressure increases, thereby providing combustor 14 with sufficient air for proper combustion.

Figure 2:
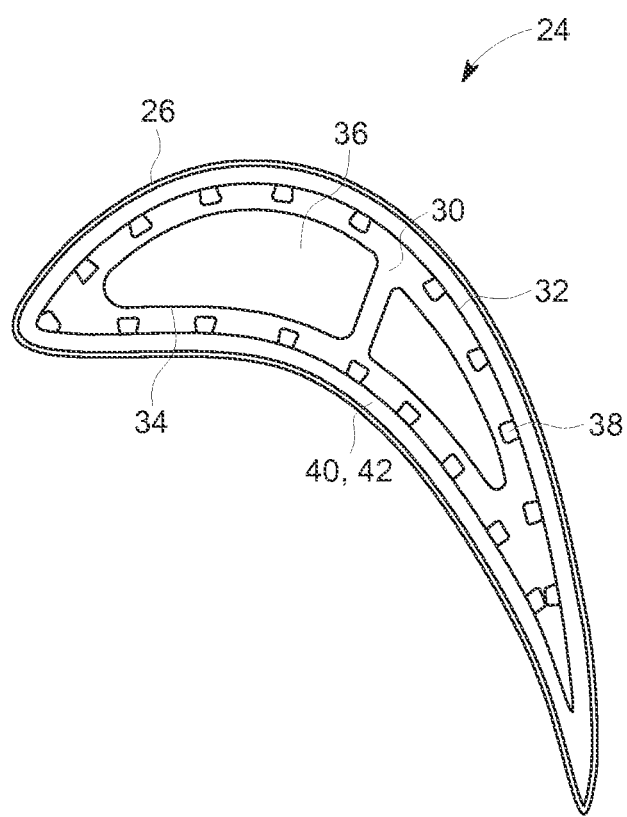
FIG. 2 is a schematic cross-section of a hot gas path component for use in the gas turbine engine shown in FIG. 1, and having a sensor material composition forming an outer layer thereof.

FIG. 2 is a schematic cross-section of hot gas path component 24 for use in gas turbine engine 10 (shown in FIG. 1) and having a sensor material composition 26 forming an outer layer thereof. In the exemplary embodiment, gas turbine engine 10 includes a plurality of hot gas path components 24. Hot gas path component 24 is any component of gas turbine engine 10 that is at least partially exposed to hot gas flow 22 through gas turbine engine 10, e.g., where the operating temperature, in one example, is above 2500 degrees Fahrenheit (° F.) (~1371 degrees Celsius (° C.)). For example, blades or vanes (also known as buckets or bucket assemblies), nozzle assemblies (also known as vanes or vane assemblies), shroud assemblies, transition pieces, retaining rings, and compressor exhaust components are all hot gas path components. It is understood, however, that hot gas path component 24 is not limited to the above examples, but can be any component that is at least partially exposed to a flow of high temperature gas. Further, it is understood that hot gas path component 24 is not limited to components in gas turbine engine 10, but can be any piece of machinery or component that can be exposed to high temperature gas flows.

When hot gas path component 24 is exposed to hot gas flow 22, hot gas path component 24 is heated by hot gas flow 22 and can reach a temperature at which the service life of hot gas path component 24 is significantly reduced. A sensor material composition 26 (shown in FIG. 2) for hot gas path component 24 is provided to enable monitoring of one or more of a temperature and a strain of hot gas path component 24, to facilitate enabling gas turbine engine 10 to operate with hot gas flow 22 at a high temperature, and to increase the efficiency and performance of gas turbine engine 10.

In the exemplary embodiment, hot gas path component 24 includes substrate 30 with an outer surface 32 and an inner surface 34. Inner surface 34 defines at least one hollow, interior space 36. Formed in outer surface 32 are one or more cooling holes or cooling channels 38. Hot gas path component 24 also includes a protective coating 40 that includes one or more layers 42. In the exemplary embodiment, the protective coating 40 is a TBC. In alternative embodiments, hot gas path component 24 can be formed from a high temperature ceramic matrix composite (CMC) and include an environmental barrier coating (EBC) system 40 that includes one or more layers 42. In the exemplary embodiment, however, coating 40 will be referred to as TBC 40. In the exemplary embodiment, cooling channels 38 function to facilitate cooling hot gas path component 24. A cooling fluid (not shown) is provided to cooling channels 38 from interior space 36, and the cooling fluid flows through cooling channels 38 to cool outer surface 32 and TBC 40.

In the exemplary embodiment, substrate 30 is formed from any suitable material, for example, without limitation, a nickel-base (Ni-base), a cobalt-base (Co-base), and an iron-base (Fe-base) superalloy. Such alloys are known to be advantageous because of a combination of desirable properties including high temperature strength and high temperature creep resistance. TBC 40 extends along at least a portion of outer surface 32 of substrate 30. Alternatively, TBC 40 extends along the entire outer surface 32. In the exemplary embodiment, TBC 40 includes one or more layers 42. As seen in FIG. 2, TBC 40 only includes a first layer 42, or structural coating. In alternative embodiments, hot gas path component 24 includes additional layers 42, for example, without limitation, a bond coat and a TBC outer layer. In one embodiment, TBC 40 includes a second material that is any suitable material bonded to outer surface 32 of substrate 30. For particular configurations, TBC 40 has a thickness in the range between about 0.1 millimeters to about 2.0 millimeters. For aviation components, TBC 40 has a thickness in the range between about 0.1 millimeters to about 0.25 millimeters. Alternatively, other thicknesses are utilized depending on the requirements for a particular hot gas path component 24.

In the exemplary embodiment, a sensor patch, or sensor material composition 26 forms a layer that extends over substantially all of TBC 40. Alternatively, sensor material composition 26 extends over a portion of TBC 40. Sensor material composition 26 includes a yttrium aluminum garnet ($Y_3 Al_5 O_{12}$, or YAG)-based ceramic doped with a rare earth element (REE). YAG-based ceramics include the YAG ceramic itself, other ceramics with the garnet structure, and alloys thereof. The term "rare earth", as used herein, refers to the rare earth elements (REEs) of scandium, yttrium, lanthanum, cerium, praseodymium, neodymium, promethium, samarium, europium, gadolinium, terbium, dysprosium, holmium, erbium, thulium, ytterbium, lutetium, and mixtures thereof. REEs have a special electron structure that enables them to have special properties of fluorescence when excited (provided with energy). For example, REEs can be used to covert long wavelength (IR) photons to shorter wavelength photons (up-conversion) and can absorb a short wavelength photon (UV) and re-emit one or more longer wavelength photons (down-conversion). The intensity of the fluorescent emissions from REEs correlates to a temperature of the specific REE, i.e., the intensity of the fluorescent emissions can be calibrated as a function of temperature.

In the exemplary embodiment, sensor material composition 26 is a combination of YAG and terbium. Sensor material composition 26 forms a layer having a thickness in the range between about 0.2 mils and about 8 mils (about 5 micrometers to about 200 micrometers). Sensor material composition 26 contains in the range between about 95% to about 99.9% by volume of YAG and in the range between about 0.1% and about 5% by volume of terbium. Alternatively, sensor material composition 26 contains a combination of any one of a YAG-based ceramic and an REE that enables sensor material composition 26 to function as described herein. For example, without limitation, in alternative embodiments, sensor material composition 26 includes dysprosium or europium, each of which can have different fluorescence properties. In this manner, sensor material composition 26 is tailored to emit radiation in a certain spectral range and in certain temperature environments.

In the exemplary embodiment, the layer of sensor material composition 26 is deposited onto hot gas path component 24, and more specifically, TBC 40, using a thermal spray process. Non-limiting examples of a thermal spray process include plasma spraying and combustion spraying. Plasma spraying includes atmospheric (such as air or inert gas) plasma spray, or low pressure plasma spray (LPPS), which is also known as vacuum plasma spray or VPS. The combustion spraying includes high velocity oxygen fuel spraying (HVOF), or high velocity air fuel spraying (HVAF). In alternative embodiments, techniques for depositing one or more layers of TBC 40 include, without limitation, sputtering, electron beam physical vapor deposition, ion plasma deposition, electroless plating, and electroplating. In the exemplary embodiment, the layer of sensor material composition 26 is formed over substantially all of TBC 40 of hot gas path component 24. Alternatively, the layer of sensor material composition 26 is formed over only a portion of TBC 40. In some embodiments, sensor material composition 26 having different REEs (to enable measuring multiple temperature regimes) or a different composition (to enable strain measurement, as described below) is deposited or printed in various discontinuous patterns over a first layer, for example, without limitation, alternating lines, grids, and various shapes covering different portions of TBC 40. Such embodiments enable tailoring the temperature measurement capability of sensor material composition 26 based on a two-dimensional temperature map of hot gas path component 24 or enable both a temperature and a strain measurement to be acquired.

In an alternative embodiment, prior to application of the sensor material composition 26, masking is applied to TBC 40 to prevent coating certain areas of hot gas path component 24. Masking is carried out using conventional techniques including, for example, without limitation, tapes, tooling, and paint-on adhesives. Subsequent to the masking of TBC 40, the layer of sensor material composition 26 is formed on TBC 40. After application of sensor material composition 26, any masking present is removed by peeling off tapes and adhesives, pyrolysis of tapes and adhesives, or removing multi-use tooling. Any rough edges remaining after masking removal is scraped or cut away using a sharp or abrasive tool.

In another alternative embodiment, sensor material composition 26 is a combination of an alumina-based ceramic doped with chromium oxide (Cr:Alumina), e.g., aluminum oxide ($Al_2O_3$) and chromium oxide ($Cr_2O_3$). Alumina-based ceramics include aluminum oxide and other ceramics that utilize alumina as a base material. The Cr:Alumina sensor material composition 26 contains in the range between about 75% to about 99.9% by volume of alumina and in the range between about 0.1% and about 25% by volume of chromium oxide. Chromium oxide, when sintered with alumina at temperatures above 1550° C., changes from a green color to a pink color, forming the mineral ruby. In this state, the chromium is in the correct molecular geometry for functioning as a strain sensing material. That is, the mineral ruby has the physical property that when put under strain, i.e., stretched, the electron transitions within the material change.

If the Cr:Alumina material is illuminated with UV light, for example, at a wavelength of about 370 nanometers (nm), the chromium will fluoresce and emit radiation at about 700 nm. When the emissions are measured with a high resolution spectrometer, there are two sharp spectral lines emitted. The peak wavelength of each spectral line has been shown to be related to the strain acting on the system. As a result, measuring the two spectral lines and finding their peaks, enables a determination of the strain of the material. In alternative embodiments of sensor material composition 26, chromium oxide is combined with gadolinium gallium garnet or gadolinium scandium garnet (also with aluminum replacing some of the gallium and/or scandium). In addition, gadolinium can be replaced by certain amounts of yttrium. In further alternative embodiments, chromium oxide is combined with rare earth aluminates, for example, without limitation, gadolinium aluminates $GdAlO_3$ and $Gd_4Al_2O_9$, yttrium orthoaluminate ($YAlO_3$), hexa-aluminates, and beta-aluminas, for example, without limitation, $La_2O_3.6Al_2O_3$ and $Na_2O.11Al_2O_3$. In each of the combinations, chromium is in the correct molecular geometry for functioning as a strain sensing material.

The Cr:Alumina layer of sensor material composition 26 needs to be sintered. Generally, the temperature to effect proper sintering is in excess of 1550° C. However, this temperature is in excess of the temperature to which hot gas path component 24 should be exposed. Accordingly, a sol-gel process is used for the layer formation of the Cr:Alumina sensor material composition 26, such that the sensor material composition can be sintered at less than 1000° C. As used herein, the term "sol-gel" refers to a process in which solid nanoparticles dispersed in a liquid (a solution, or "sol") aggregate together to form a continuous three-dimensional network extending throughout the liquid (a "gel").

In the exemplary embodiment, a layer of sensor material composition 26 is deposited onto hot gas path component 24, and more specifically, TBC 40, using any conventional sol-gel deposition method, for example, without limitation, screen printing, pad printing, and direct write technology. In the exemplary embodiment, the layer of sensor material composition 26 is formed over substantially all of TBC 40 of hot gas path component 24. In one alternative embodiment, the layer of sensor material composition 26 is formed over only a portion of TBC 40. After depositing the sol-gel composition, sensor material composition 26 is sintered at a temperature of about 1000° C. to form the final sensor material composition 26 layer.

Figure 3:
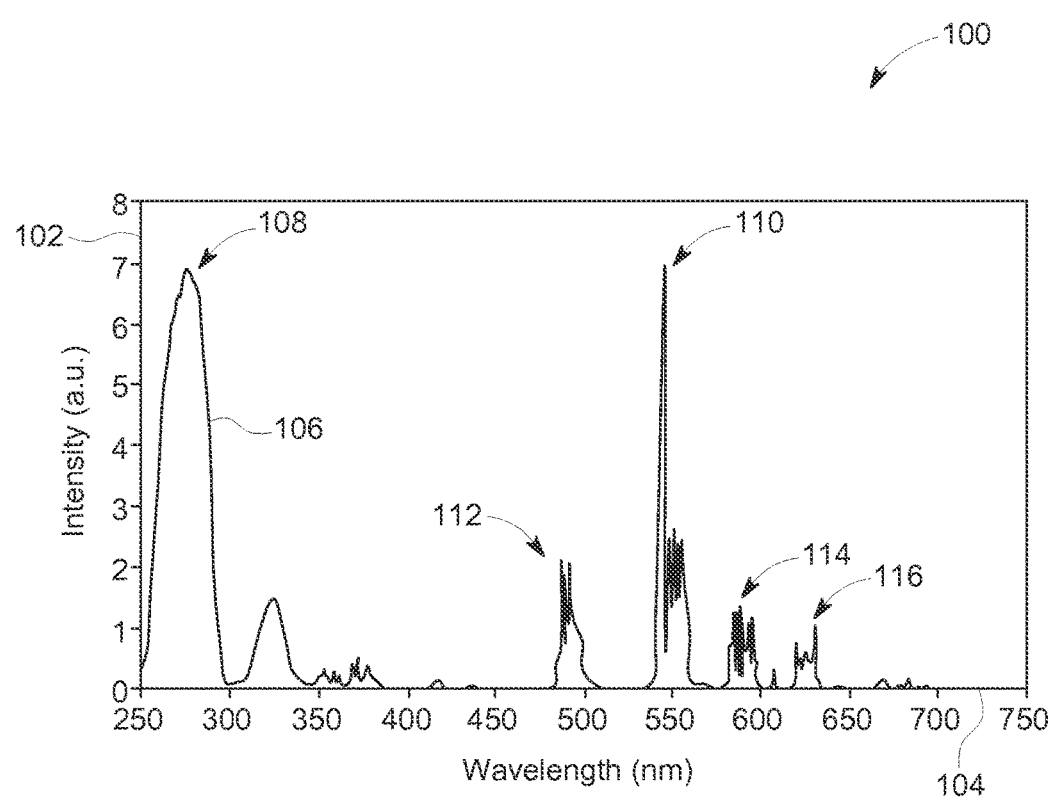
FIG. 3 is a graph generally showing the absorption and emission spectra for one embodiment of the sensor material composition shown in FIG. 2.

FIG. 3 is a graph 100 generally showing the absorption and emission spectra curve 106 for one embodiment of sensor material composition 26 (shown in FIG. 2). Y-axis 102 represents intensity in increments of 1 arbitrary unit (a.u.) extending from 0 a.u. to 8 a.u. X-axis 104 represents wavelength in increments of 50 nanometers (nm) extending from 250 nm to 750 nm. In the exemplary embodiment, sensor material composition 26 includes YAG having about 3% by volume of terbium. Doping sensor material composition 26 with rare earth materials such as terbium results in the sensor material composition 26 exhibiting fluorescent properties, and in particular, fluorescent properties that correlate to a temperature of the material. For example, without limitation, when sensor material composition 26 is exposed to photons having a specific wavelength, for example, an ultraviolet (UV) wavelength of about 266 nm, generally indicated at 108, it activates photonic properties of terbium. The resulting visible light is emitted as photons having a wavelength grouping in the range between about 540 nm to about 560 nm, generally indicated at 110. Furthermore, photons having wavelength groupings of lower intensities occur in the ranges between about 480 nm to about 510 nm, generally indicated at 112, between about 580 nm to about 600 nm, generally indicated at 114, and between about 615 nm to about 640 nm, generally indicated at 116.

Figure 4:
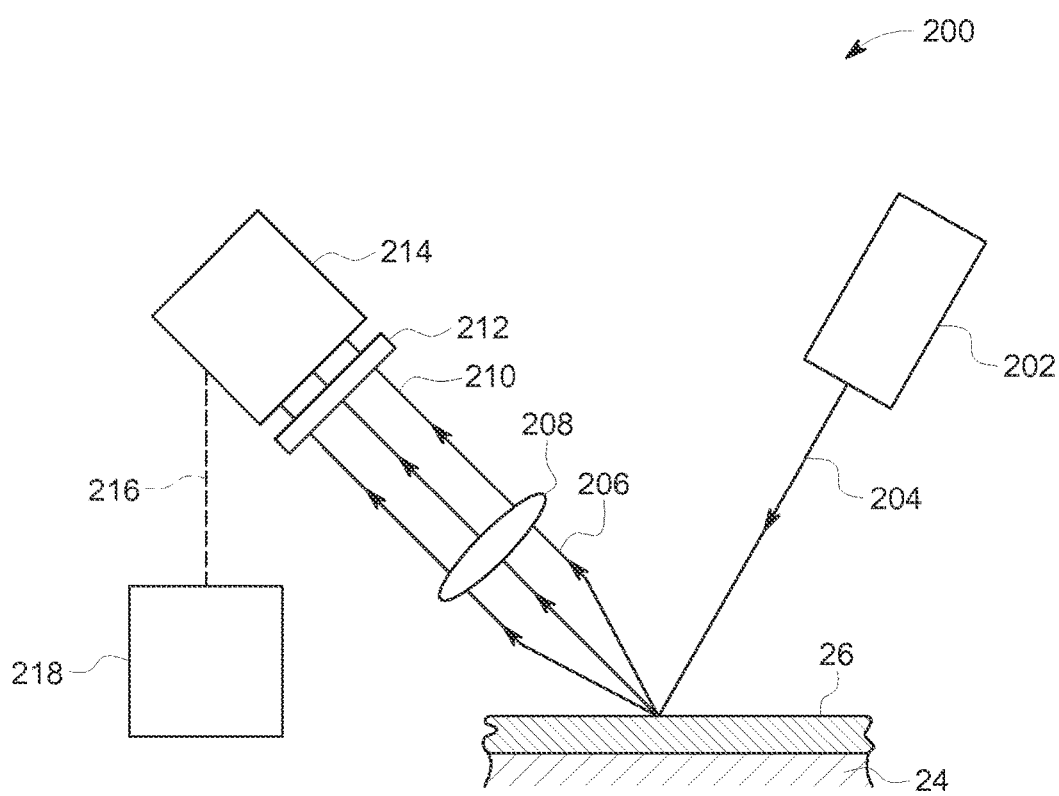
FIG. 4 is a schematic of an exemplary monitoring system for use with the gas turbine engine shown in FIG. 1.

FIG. 4 is a schematic of an exemplary monitoring system 200 for use with gas turbine engine 10 (shown in FIG. 1). In the exemplary embodiment, monitoring system 200 includes hot gas path component 24 having a layer of sensor material composition 26 formed thereon. A radiation source 202, for example, without limitation, a broadband light source (i.e., a light source emitting a wide band of wavelengths, such as a xenon lamp, a light emitting diode (LED), or a halogen lamp (HL)), or a laser device emits an excitation beam 204 that excites the materials comprising sensor material composition 26. The laser device is one of a continuous-wave laser or a pulsed laser, and includes, for example, without limitation, a neodymium-doped yttrium aluminum garnet (Nd:YAG) excitation laser, a xenon fluoride (XeF) excimer laser, or any other laser that enable system 200 to function as described herein. In some embodiments, the laser device includes one of a single wavelength or a multi-wavelength laser. In the exemplary embodiment, excitation beam 204 has a wavelength that is in the range between about 250 nm to about 290 nm and is a pulsed laser device. The use of a pulsed light source enables thermal emissions from the background, i.e., background radiation, to be eliminated, thereby facilitating easing the measurement process. In an alternative embodiment, excitation beam 204 is any wavelength that enables sensor material composition 26 to function as described herein.

Further, in the exemplary embodiment, sensor material composition 26 emits a fluorescent radiation 206 in response to excitation beam 204. Fluorescent radiation 206 is in the range between about 475 nm to about 650 nm and has an intensity that correlates to the surface temperature of sensor material composition 26. Alternatively, fluorescent radiation 206 can be any wavelength range that enables monitoring system 200 to function as described herein. In the exemplary embodiment, system 200 includes an optical focusing device 208, for example, without limitation, an optical lens, a mirror, or any combinations thereof, to generate a focused fluorescent radiation 210. A filter 212, for example, without limitation, an absorptive optical filter, an interference optical filter, a monochromator, or combinations thereof, is used to filter specific portions of the spectrum comprising focused fluorescent radiation 210. Filter 212 blocks wavelengths substantially similar to radiation source 202 from fluorescent radiation 206 and permits specific wavelengths to pass.

In the exemplary embodiment, monitoring system 200 includes at least one optical detector 214, for example, a photomultiplier tube (PMT), for receiving and measuring the intensity of focused fluorescent radiation 210. Alternatively, optical detector 214 is any one of several known optical detectors that enable system 200 to function as described herein. For example, without limitation, optical detector 214 can be any one of a photodiode (PD) and a camera. In some embodiments, optical detector 214 includes more than one optical detector for detecting more than one wavelength of radiation. While system 200 is described as including optical detector 214 for receiving focused fluorescent radiation 210, it should be noted that use of the term "optical" is not to be equated with the term "visible." System 200, as described herein, is configured to capture a wide spectral range. Optical detector 214 is a sensitive detector of light with wavelengths in the ultraviolet (about 200-400 nanometers (nm)), visible (about 400-700 nm), near-infrared (about 700-1200 nm), and infrared ranges (about 1200-10000 nm) of the electromagnetic spectrum. The wavelengths of photons emitted by sensor material composition 26 depend on the composition of sensor material composition 26. Accordingly, system 200 is capable of measuring many different wavelengths of light, which correlate to a temperature of hot gas path component 24.

Moreover, in the exemplary embodiment, optical detector 214 is electrically coupled via electrical coupler 216 to an optical signal analyzer 218. Optical signal analyzer 218 operates at least partially as a data acquisition device and analyzes focused fluorescent radiation 210 received by optical detector 214. Optical signal analyzer 218 is a computer system that includes at least one processor (not shown) that executes operations to analyze focused fluorescent radiation 210 based at least partially on input from optical detector 214.

Figure 5:
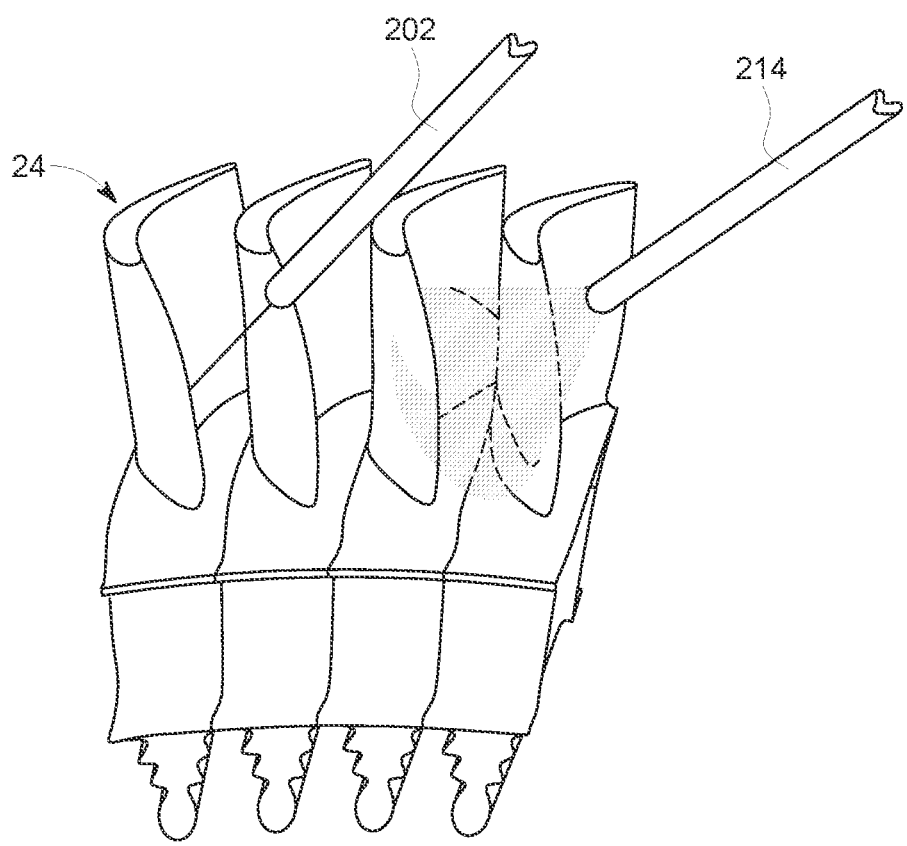
FIG. 5 is a partial schematic of the gas turbine engine shown in FIG. 1 having a line of sight (LOS) configuration of the monitoring system shown in FIG. 4.
Figure 6:
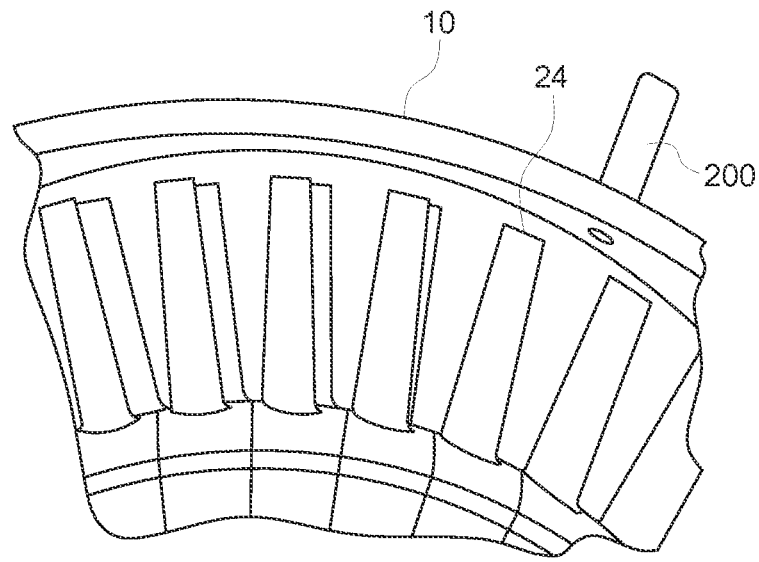
FIG. 6 is a partial schematic of the gas turbine engine shown in FIG. 1 having components of the monitoring system shown in FIG. 4 outside of the hot gas path flow.

In the exemplary embodiment, monitoring system 200 is a harsh-environment monitoring system including, for example, an online line-of-sight (LOS) system for real-time measurement of the surface temperature of hot gas path component 24, for example, without limitation, first-stage blades or buckets. As shown in FIGS. 5 and 6, gas turbine engine 10 includes, for example, optical access ports for harsh environment applications that allow remote sensing of emissions or photo-luminescence under harsh environments using radiation source 202 and optical detector 214. FIG. 5 is a partial schematic of gas turbine engine 10 (shown in FIG. 1) having a line of sight (LOS) monitoring system 200 for online monitoring of hot gas path component 24. FIG. 6 is a partial schematic of gas turbine engine 10 having components of monitoring system 200 outside of the hot gas path flow.

Phosphor thermometry uses the temperature and wavelength dependent emission characteristics of light emitting materials, i.e., following excitation by light, light emitting materials, such as REEs, emit photons at a temperature-dependent intensity. Use of wavelength dependent detection allows for increased accuracy of the temperature determination and increased contrast of the strain information. In one suitable approach for measuring temperature from an optical signal, i.e., fluorescent radiation 206, the ratio of emission lines can be used to infer temperature. A traditional method for measuring temperatures in gas turbine engines includes the use of infrared (IR) cameras, which are only accurate to about ±30° C.

Figure 7:
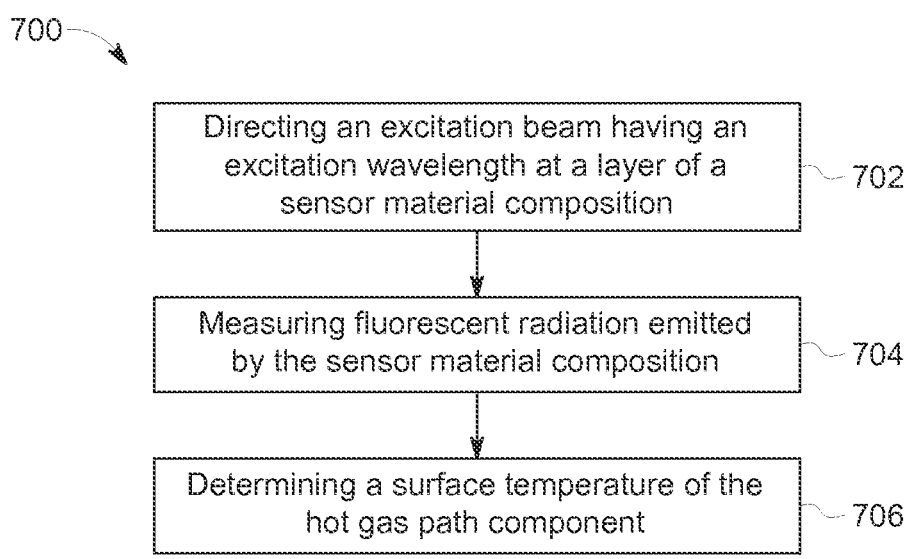
FIG. 7 is a block diagram showing an exemplary method for measuring a surface temperature of the hot gas path component shown in FIG. 2 using the sensor material composition.

FIG. 7 is a block diagram showing an exemplary method 700 for measuring a surface temperature of hot gas path component 24 (shown in FIG. 2) using sensor material composition 26 (shown in FIG. 2). In the exemplary method 700, sensor material composition 26 forms a layer on hot gas path component 24. More specifically, sensor material composition 26 forms a layer of material that extends substantially over all of TBC 40 (shown in FIG. 2), as hot gas path component 24 has TBC 40 applied for environmental protection. Radiation source 202 emits 702 excitation beam 204 (shown in FIG. 4), which is directed at the layer of sensor material composition 26. As excitation beam 204 impacts sensor material composition 26, the REE contained in sensor material composition 26 begins to fluoresce and emits fluorescent radiation 206 (shown in FIG. 4) in response to excitation beam 204 (shown in FIG. 4). In the exemplary embodiment, fluorescent radiation 206 includes at least two different wavelengths of fluorescent radiation 206. The wavelength and intensity of each of the two wavelengths are measured 704 by optical detector 214 (shown in FIG. 4). In one embodiment, radiation source 202 emits excitation beam 204 in the UV spectrum (e.g., photons having a wavelength of about 275 nm) resulting in fluorescent radiation 206 emitted in the visible spectrum. This is known as down-conversion fluorescence, i.e., sensor material composition 26 absorbs photons having the shorter UV wavelength and emits photons having a longer visible wavelength. Alternatively, radiation source 202 emits excitation beam 204 in the IR spectrum (e.g., a wavelength of about 950 nm) resulting in fluorescent radiation 206 emitted in the visible spectrum. This is known as up-conversion fluorescence, i.e., sensor material composition 26 absorbs photons having the longer IR wavelength and emits photons having a shorter visible wavelength. In the exemplary embodiment, optical signal analyzer 218 (shown in FIG. 4) determines 706 the surface temperature of component 24 based on a calculated ratio of the intensity between the two wavelengths of fluorescent radiation 206 emitted by sensor material composition 26.

Figure 8:
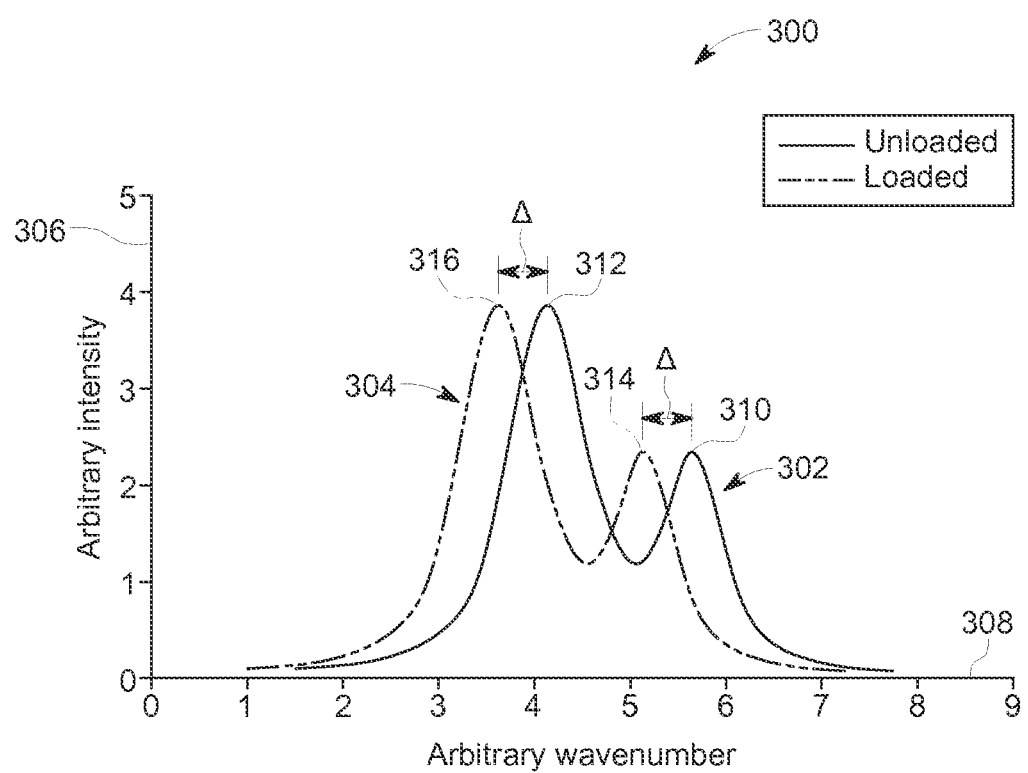
FIG. 8 is a graph generally showing the emission spectra curves for an alternative embodiment of the sensor material composition shown in FIG. 2.

FIG. 8 is a graph 300 generally showing the emission spectra curves 302, 304 for the alternative embodiment of sensor material composition 26 (shown in FIG. 2). Curve 302 is a general representation of the emission spectra associated with sensor material composition 26 in an unloaded state, i.e., with no strain induced into the material. Curve 304 is a general representation of the emission spectra associated with sensor material composition 26 in a loaded state, i.e., with a certain amount of strain induced into the material. Y-axis 306 represents intensity in increments of 1 arbitrary unit (a.u.) extending from 0 a.u. to 5 a.u. X-axis 308 represents wavelength in increments of 1 arbitrary unit extending from 0 a.u. to 9 a.u. In the exemplary embodiment, sensor material composition 26 includes a combination of alumina doped with chromium oxide, e.g., $Al_2O_3$ having about 5% by volume of $Cr_2O_3$. Doping sensor material composition 26 with chromium oxide results in the sensor material composition 26 exhibiting fluorescent properties, and in particular, fluorescent properties that correlate to a strain in the material. For example, without limitation, when sensor material composition 26 is exposed to photons having a specific wavelength, for example, an ultraviolet (UV) wavelength of about 375 nm, it activates photonic properties of the chromium in the sensor material combination. The resulting visible light is emitted as photons producing a sharp doublet, i.e., two peaks 310, 312, at about 700 nm. As strain is induced into sensor material composition 26, emission peaks 310, 312, shift along the wavelength scale to new emission wavelength peaks 314, 316, respectively, based on the amount of strain.

Plastic distortion (i.e., strain) of gas turbine engine components is a significant cause of reduced service life, and is often referred to as creep. There are many techniques employed to measure creep, many including the use of a coordinate measuring machine or hard gauges to measure a physical property of the component. There are also printed sensors available to facilitate measuring creep. However, all of these known creep measurement strategies require the component to be removed from the gas turbine engine and measured at room temperature. By using the Cr:Alumina sensor material composition 26, creep can be measured through a borescope in a hot shut-down situation of gas turbine engine 10 where hot gas path component 24 can be in a heated state. In one embodiment, for example, hot gas path component 24 can be at an elevated temperature of approximately 150° C. The Cr:Alumina sensor material composition 26 simultaneously provides information about the strain and the temperature of hot gas path component 24, enabling a user to remove any contribution to non-plastic thermal expansion, thereby facilitating providing a more accurate creep measurement without requiring hot gas path component 24 to be removed from gas turbine engine 10. In addition, the use of the Cr:Alumina sensor material composition 26 facilitates enabling the creep measurement to be taken before hot gas path component 24 returns to room temperature.

Figure 9:
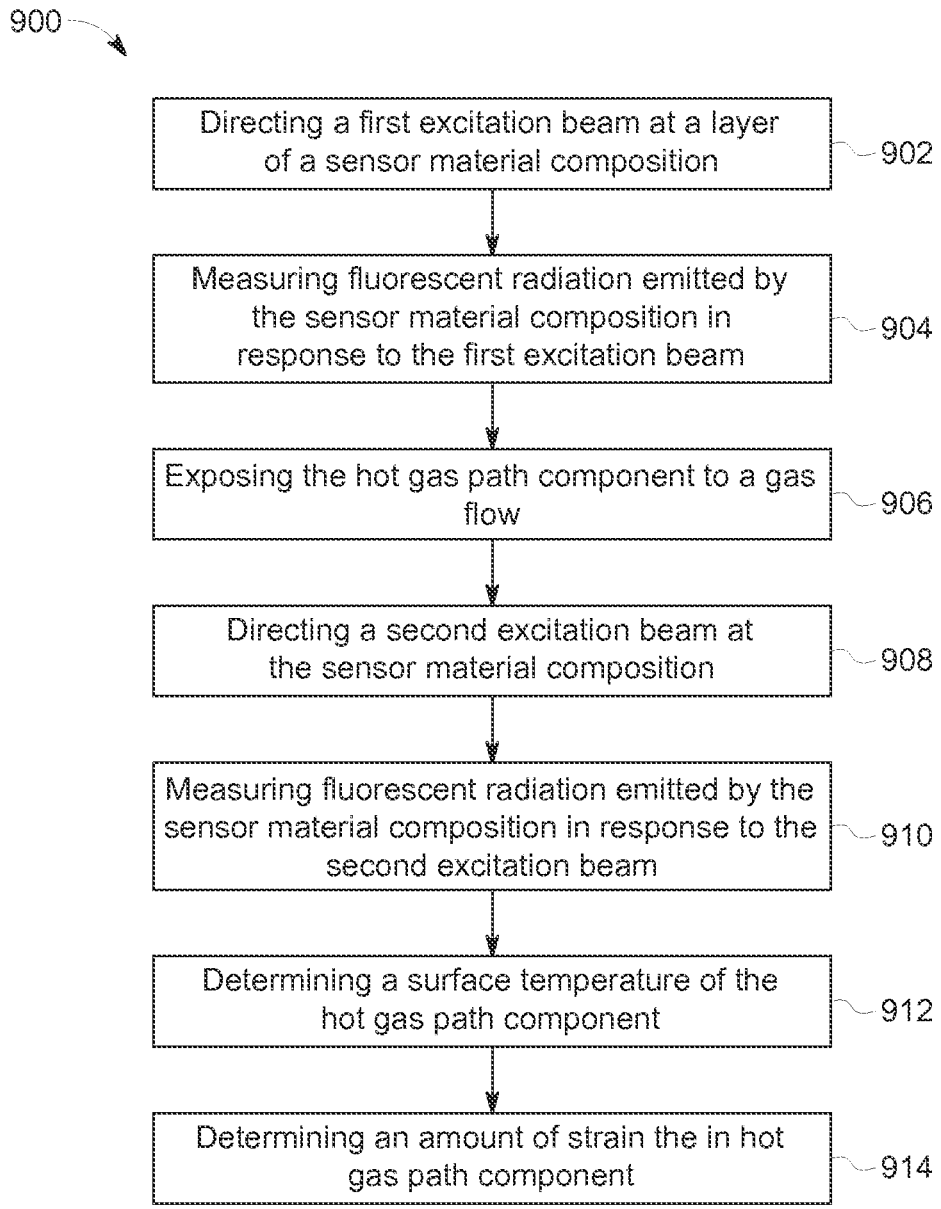
FIG. 9 is a block diagram showing a method for measuring one or more of a surface temperature and an amount of strain of the hot gas path component shown in FIG. 2 using the sensor material composition.

FIG. 9 is a block diagram showing an exemplary method 900 for measuring one or more of a surface temperature and an amount of strain of hot gas path component 24 (shown in FIG. 2) using sensor material composition 26 (shown in FIG. 2). In the exemplary method 900, sensor material composition 26 is a Cr:Alumina combination and forms a layer on hot gas path component 24. More specifically, sensor material composition 26 forms a layer of material that extends substantially over all of TBC 40 (shown in FIG. 2), as hot gas path component 24 has TBC 40 applied for environmental protection. After formation of the sensor material composition 26 layer and prior to service use of hot gas path component 24, radiation source 202 (shown in FIG. 4) is used to emit 902 excitation beam 204, which is directed at the layer of sensor material composition 26. As excitation beam 204 impacts sensor material composition 26, the chromium contained in sensor material composition 26 begins to fluoresce and emits fluorescent radiation 206 (shown in FIG. 4) in response to excitation beam 204. In the exemplary embodiment, fluorescent radiation 206 includes at least two different wavelength peaks 310, 312 (shown in FIG. 8), of fluorescent radiation 206. The wavelengths of each of the two peaks 310, 312 are measured 906 by optical detector 214 (shown in FIG. 4) to determine a baseline value. After the baseline value is obtained, hot gas path component is placed into service where it is exposed 906 to a gas flow, and in particular, to hot gases.

Subsequent to exposing hot gas path component 24 to hot gases, radiation source 202 emits 908 excitation beam 204, which is directed at sensor material composition 26. As excitation beam 204 impacts sensor material composition 26, the chromium contained in sensor material composition 26 begins to fluoresce and emits fluorescent radiation 206 in response to excitation beam 204. In the exemplary embodiment, fluorescent radiation 206 includes at least two different successive wavelength peaks 314, 316 (shown in FIG. 8), of fluorescent radiation 206 that are different from baseline peaks 310, 312. The wavelengths of each of the two successive peaks 314, 316 are measured 910 by optical detector 214 (shown in FIG. 4). In one embodiment, radiation source 202 emits excitation beam 204 in the UV spectrum (e.g., photons having a wavelength of about 266 nm) resulting in fluorescent radiation 206 emitted in the visible spectrum. This is known as down-conversion fluorescence, i.e., sensor material composition 26 absorbs photons having the shorter UV wavelength and emits photons having a longer visible wavelength. Alternatively, radiation source 202 emits excitation beam 204 in the IR spectrum (e.g., a wavelength of about 950 nm) resulting in fluorescent radiation 206 emitted in the visible spectrum. This is known as up-conversion fluorescence, i.e., sensor material composition 26 absorbs photons having the longer IR wavelength and emits photons having a shorter visible wavelength. In the exemplary embodiment, optical signal analyzer 218 determines 912 the surface temperature of hot gas path component 24 based on the intensity of fluorescent radiation 206 emitted by sensor material composition 26, and determines 914 the strain in hot gas path component 24 based on the wavelength shift of the peaks 314, 316 of fluorescent radiation 206 emitted by sensor material composition 26.

In an alternative embodiment, a first layer of sensor material composition 26 forms a layer on hot gas path component 24. In particular, a first layer of the YAG-based ceramic and REE sensor material composition 26 is formed on hot gas path component 24. In addition, a second layer of sensor material composition 26 is formed on the first layer of sensor material composition 26. More specifically, the second layer of sensor material composition 26 is a Cr:Alumina combination and is deposited in a discontinuous pattern over the first layer. For example, the second layer of Cr:Alumina sensor material composition 26 is patterned, for example, without limitation, as alternating lines, grids, and various shapes covering different portions of the first layer of sensor material composition 26. Such an embodiment enables both a real-time temperature to be acquired, and an offline temperature and strain measurement to be acquired, such that the temperature of the part can be factored into the strain calculations enabling the removal of temperature contribution to non-plastic thermal expansion. This yields a more accurate creep measurement without requiring the part to be removed from gas turbine engine 10 as well as facilitating time savings by enabling measurements to be acquired before hot gas path component 24 returns to room temperature.

The methods, apparatus, and systems described herein facilitate measuring a surface temperature and strain of a hot gas path component. Specifically, the methods, apparatus, and systems described herein facilitate using a radiation source to cause a sensor material composition on a TBC coating of the hot gas path component to fluoresce, where the intensity of the fluorescent emission is based on a surface temperature of the component and the peak wavelength shift of the fluorescent emissions is based on a strain induced into the component. Therefore, measuring the amount of strain in the component gives an indication of the remaining life of the component, i.e., an expected life.

An exemplary technical effect of the methods, systems, and apparatus described herein includes at least one of: (a) providing accurate surface temperature measurements for a hot gas path component; (b) using the existing TBC coating without adding other materials to the composition; (c) facilitating online or real-time temperature monitoring; and (d) facilitating component creep monitoring and quality control.

Exemplary embodiments of a method for measuring a surface temperature of a hot gas path component and a system for use therein are described above in detail. The methods, systems, and apparatus are not limited to the specific embodiments described herein, but rather, components of the systems and apparatus, and/or steps of the methods may be utilized independently and separately from other components and/or steps described herein. For example, the sensor material and methods may also be used in combination with other components and methods, and are not limited to practice with only the gas turbine engines and systems as described herein. Rather, the exemplary embodiment can be implemented and utilized in connection with many other high temperature applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of monitoring a temperature and an amount of strain of a hot gas path component, said method comprising:
   directing a first excitation beam at a first layer of a sensor material composition deposited on an outer surface of the hot gas path component;
   measuring fluorescent radiation emitted by the sensor material composition in response to the first excitation beam, the fluorescent radiation including at least a first emission peak having a first baseline wavelength and a first baseline intensity, and a second emission peak having a second baseline wavelength and a second baseline intensity;
   exposing the hot gas path component to a gas flow;
   directing a second excitation beam at the first layer of the sensor material composition;
   measuring fluorescent radiation emitted by the sensor material composition in response to the second excitation beam, wherein a first emission peak includes a first successive wavelength and a first successive intensity, and a second emission peak includes a second successive wavelength and a second successive intensity;
   determining a surface temperature of the hot gas path component based on one or more of the first successive intensity and the second successive intensity; and
   determining an amount of strain the in hot gas path component based on a difference between the first baseline wavelength and the first successive wavelength, and a difference between the second baseline wavelength and the second successive wavelength of the fluorescent radiation.

2. The method in accordance with claim 1, wherein the sensor material composition comprises a combination of an alumina-based ceramic material and chromium oxide ($Cr_2O_3$).

3. The method in accordance with claim 1, wherein measuring fluorescent radiation comprises measuring fluorescent radiation using an optical detector including one or more of a photomultiplier tube, a photodiode, and a camera.

4. The method in accordance with claim 1, wherein the sensor material composition includes comprises combination of aluminum oxide ($Al_2O_3$) and chromium oxide ($Cr_2O_3$).

5. The method in accordance with claim 4, wherein aluminum oxide is present in a range between about 75% to about 99.9% by volume and chromium oxide is present in a range between about 0.1% and about 25% by volume.

6. The method in accordance with claim 1 further comprising producing at a point of impact of the first and second excitation beams a frequency down-conversion fluorescent radiation.

7. The method in accordance with claim 6, wherein the first and second excitation beams have an excitation wavelength in the range between about 200 nanometers and about 400 nanometers.

8. The method in accordance with claim 1, wherein directing the first or second excitation beams or both excitation beams comprises directing the first or second excitation beams or both excitation beams using one or more of a laser device and a broadband light source.

9. The method in accordance with claim 8, wherein the broadband light source includes one or more of a xenon lamp, a light emitting diode (LED), or a halogen lamp (HL).

10. The method in accordance with claim 8, wherein the laser device comprises one or more of a continuous-wave laser device and a pulsed laser device.

11. The method in accordance with claim 10, wherein the pulsed laser device comprises one or more of a pulsed neodymium-doped yttrium aluminum garnet (Nd:YAG) excitation laser and a pulsed xenon fluoride (XeF) excimer laser.

12. The method in accordance with claim 1, wherein directing the first and second excitation beams comprises directing the first and second excitation beams at the first layer of a sensor material composition deposited on an outer surface of the hot gas path component and a second layer of sensor material composition deposited on the first layer in a discontinuous pattern.

13. The method in accordance with claim 12, wherein the first layer of sensor material composition includes a combination of a yttrium aluminum garnet (YAG)-based ceramic material and at least one rare earth element (REE).

14. The method in accordance with claim 13, wherein the second layer of sensor material composition including a combination of an alumina-based ceramic material and chromium oxide ($Cr_2O_3$).

15. The method in accordance with claim 13, wherein the rare earth element is selected from the group consisting of scandium, yttrium, lanthanum, cerium, praseodymium, neodymium, promethium, samarium, europium, gadolinium, terbium, dysprosium, holmium, erbium, thulium, ytterbium, lutetium and mixtures thereof.

16. The method in accordance with claim 15, wherein the rare earth element is terbium.

* * * * *